United States Patent
Benkert et al.

(10) Patent No.: US 9,660,256 B2
(45) Date of Patent: May 23, 2017

(54) STORAGE ELEMENT FOR A SOLID ELECTROLYTE BATTERY

(75) Inventors: Katrin Benkert, Schwaig (DE);
Carsten Schuh, Baldham (DE);
Thomas Soller, Landau/Isar (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 380 days.

(21) Appl. No.: 14/343,852

(22) PCT Filed: Sep. 4, 2012

(86) PCT No.: PCT/EP2012/067157
§ 371 (c)(1),
(2), (4) Date: Mar. 9, 2014

(87) PCT Pub. No.: WO2013/045225
PCT Pub. Date: Apr. 4, 2013

(65) Prior Publication Data
US 2014/0220447 A1    Aug. 7, 2014

(30) Foreign Application Priority Data

Sep. 27, 2011   (DE) .................. 10 2011 083 540
Oct. 7, 2011    (DE) .................. 10 2011 084 181

(51) Int. Cl.
*H01M 4/131*    (2010.01)
*H01M 4/38*     (2006.01)
(Continued)

(52) U.S. Cl.
CPC ............. *H01M 4/131* (2013.01); *H01M 4/38* (2013.01); *H01M 4/523* (2013.01); *H01M 4/801* (2013.01);
(Continued)

(58) Field of Classification Search
CPC ........ H01M 4/131; H01M 4/38; H01M 4/523; H01M 4/801; H01M 4/803; H01M 10/39; H01M 2004/021; H01M 4/666
See application file for complete search history.

(56) References Cited

U.S. PATENT DOCUMENTS 2,627,531 A    2/1953  Vogt
5,217,822 A *  6/1993  Yoshida .............. H01M 4/9066
                                                      264/618

(Continued)

FOREIGN PATENT DOCUMENTS

DE    68918580 T2    8/1995
EP    0388558 A2     9/1990
(Continued)

OTHER PUBLICATIONS

EP2335807 MT.*

*Primary Examiner* — Alex Usyatinsky
(74) *Attorney, Agent, or Firm* — Beusse Wolter Sanks & Maire

(57) ABSTRACT

A storage element for a solid electrolyte battery is provided, having a main member including a porous ceramic matrix in which particles that are made of a first metal and/or a metal oxide and jointly form a redox couple are embedded. The storage element further includes particles made of another metal and/or an associated metal oxide, the other metal being electrochemically more noble than the first metal.

10 Claims, 3 Drawing Sheets

(51) Int. Cl.
  *H01M 4/52* (2010.01)
  *H01M 4/80* (2006.01)
  *H01M 10/39* (2006.01)
  *H01M 4/66* (2006.01)
  *H01M 4/02* (2006.01)

(52) U.S. Cl.
  CPC ........... *H01M 4/803* (2013.01); *H01M 10/39* (2013.01); *H01M 4/666* (2013.01); *H01M 2004/021* (2013.01)

(56) References Cited

U.S. PATENT DOCUMENTS

| | | |
|---|---|---|
| 2005/0069756 A1 | 3/2005 | Robert et al. |
| 2011/0177407 A1* | 7/2011 | Majima ................ B01D 53/326 429/422 |
| 2014/0205918 A1* | 7/2014 | Schuh ..................... H01M 4/38 429/405 |

FOREIGN PATENT DOCUMENTS

| | | |
|---|---|---|
| EP | 1513214 A1 | 3/2005 |
| EP | 2335807 A1 | 6/2011 |
| JP | 9092294 A | 4/1997 |
| JP | 9129244 A | 5/1997 |
| WO | 9819351 A2 | 5/1998 |
| WO | WO 2010035691 * | 4/2010 |

* cited by examiner

STORAGE ELEMENT FOR A SOLID ELECTROLYTE BATTERY

CROSS REFERENCE TO RELATED APPLICATIONS

This application is the US National Stage of International Application No. PCT/EP2012/067157 filed Sep. 4, 2012, and claims the benefit thereof. The International Application claims the benefit of German Application No. DE 102011083540.7 filed Sep. 27, 2011, and German Application No. DE 10 2011 084 181.4 filed Oct. 7, 2011. All of the applications are incorporated by reference herein in their entirety.

FIELD OF INVENTION

The invention relates to a storage element for a solid electrolyte battery.

BACKGROUND OF INVENTION

Solid electrolyte batteries are constructed using a solid-state electrolyte in the manner of a fuel cell. The electrolyte is arranged between two electrodes, of which one is an air electrode having a material which dissociates atmospheric oxygen and conducts the oxygen ions formed to the electrolyte. The electrolyte is likewise made of a material which can conduct oxygen ions. At the side of the electrolyte opposite the air electrode, there is the second electrode which includes a metal or metal oxide to be oxidized and reduced, respectively. The battery is discharged by the metal being oxidized by means of oxygen ions from the atmospheric oxygen and charged by the metal oxide being reduced with release of oxygen ions on application of a voltage, with the oxygen ions then migrating through the electrolyte to the air electrode from where they are released as molecular oxygen into the surroundings. Modern developments in the field of solid electrolyte batteries have led to the second electrode no longer being itself utilized as storage medium but an additional storage medium which is formed by the redox pair of a first metal and metal oxide being provided. An additional fluidic redox pair which transports the oxygen ions between the second electrode and the storage medium is then provided. The battery is operated at relatively high temperatures of up to 900° C.

The design of the storage elements hitherto starts out from a skeleton-like structure having a high open porosity. To reduce the tendency for sintering to occur at the operating temperatures prevailing in the solid electrolyte batteries, use is made of ODS (oxide dispersion strengthened) metal and metal oxide particles. Furthermore, the metal and metal oxide particles are separated from one another by a ceramic matrix.

During the discharging process, i.e. in the course of the oxidation process, oxygen ions diffuse into the metal particles of the storage element. Furthermore, diffusion of the metal atoms to the oxygen source of the battery also takes place during the oxidation process. This is a disadvantage in terms of the structural stability of the storage medium. To ensure very complete utilization of the storage capacity together with optimal charging and discharging kinetics, it is particularly important that the metal particles are very finely dispersed, i.e. with a large active surface area at which the oxidation and reduction processes can take place, in the storage element. However, as a result of the tendency of the metal to diffuse in the direction of the oxygen ion gradient, demixing of the storage structure and thus an increase in the interparticle contacts between the metal and metal oxide particles takes place in the medium term. This increase in the interparticle contacts leads, owing to the high operating temperature, to sintering of the particles and thus to a decrease in the active surface area of the metal particles present. This hinders the charging and discharging process and impairs the respective kinetics. In addition, the effectively utilizable storage capacity of the store is reduced thereby.

SUMMARY OF INVENTION

It is therefore an object of the present invention to provide a storage element which is particularly stable in respect of diffusion-related demixing of its fine structure.

This object is achieved by a storage element having the features of the independent claim.

Such a storage element for a solid electrolyte battery comprises a main element composed of a porous ceramic matrix in which particles of a first metal and/or an associated metal oxide, which together form a redox pair, are embedded.

According to an embodiment of the invention, it is provided that the storage element comprises particles of a further metal and/or an associated metal oxide which is more electrochemically noble than the first metal. As a result of the position of the further metal in the electrochemical series, this is not also oxidized during the oxidation-reduction cycle of the first metal and is therefore present in stable metallic form or is formed from the oxide of the further metal during the first reduction cycle and from this point in time is present in stable metallic form. If the first metal is provided by reduction of the metal oxide during the course of charging of the solid electrolyte battery, the first metal can form an alloy with the further metal. This makes it possible to equalize any concentration gradients of the first metal by solid-state diffusion. This significantly hinders the demixing of the storage element, so that the latter retains the desired structure for longer. A storage capacity which is stable in the long term and charging and discharging kinetics of the storage element which are stable in the long term are ensured in this way.

For this purpose, it is particularly advantageous for the further metal in the alloy formed from the first metal and the further metal to have a different, in particular lower, diffusion velocity in solids than the first metal, so that demixing is particularly reliably avoided.

The composition of the storage element advantageously comprises a proportion by volume of the particles of the first metal and/or the metal oxide of more than 50% by volume of the solids volume of the storage element and a proportion by volume of the particles of the further metal of less than 50% by volume of the solids volume of the storage element. To make particularly good inward diffusion of the oxygen ions possible, the storage element preferably has a pore volume of less than 50% by volume based on the total volume of the storage element.

A particularly simple and stable system can be obtained when iron is used as the first metal. The associated oxides which are present in the discharged state of the battery are then, for example, $FeO$, $Fe_3O_4$, $Fe_2O_3$.

In the case of iron/iron oxide-based storage elements, it is particularly advantageous to use nickel as further metal. Of course, other more noble metals, for example copper, silver, gold, platinum or palladium, are also possible, but nickel is first choice for cost reasons. The use of nickel also makes it possible to form a particularly homogeneous system since, for example, tapping electrodes in the form of nickel meshes can also be used on the anode side.

As matrix material, it is advantageous to use an oxidic ceramic derived from main group or transition group metals. The use of aluminum oxide, magnesium oxide or titanium oxide is particularly advantageous. Mixed oxides of yttrium, scandium and zirconium or of gadolinium and cerium can also be used, as can complex mixed oxides having a first metal component from the group having lanthanum, strontium, calcium, barium, cerium and a second metallic component from the group having iron, titanium, chromium, gadolinium, cobalt and manganese. It is particularly important here that the oxides used are thermally stable both in the operating temperature range of the solid electrolyte battery, i.e. up to 900° C., and do not have a tendency to be reduced under the electrochemical conditions in the storage element.

There are likewise a number of possibilities for the structuring of the storage element. Firstly, it is possible to distribute the particles of the first metal and/or the metal oxide and the particles of the further metal and/or metal oxide homogeneously in the matrix. This is a particularly simple variant from a manufacturing point of view since such storage elements can be produced in a very simple way by pressing, extrusion, tape casting or the like of the appropriately prepared and mixed slip.

More complex structures are also possible; for example, it is conceivable to build up the storage element from alternating layers of ceramic matrix with embedded particles of the metal and/or metal oxide and layers of particles of the further metal. The purely metallic intermediate layers in this case form particularly efficient diffusion barriers for the metal in a preferential direction.

A contiguous skeleton structure formed by the further metal within the matrix is also possible. Here too, efficient diffusion barriers are formed, but, in contrast to a layer-structured construction, these have no preferential direction.

BRIEF DESCRIPTION OF THE DRAWINGS

Embodiments of the invention are illustrated below with the aid of the drawing, in which.

DETAILED DESCRIPTION OF INVENTION

A storage element denoted overall by 10 for a solid electrolyte battery comprises a ceramic matrix 12 in which a first class of particles 14 of a metal or an associated metal oxide and also a second class of particles 16 of a further metal and/or an associated metal oxide are embedded.

During charging operation of a solid electrolyte battery having such a storage element 10, a solid electrolyte fuel cell assigned to the storage element 10 is operated in the electrolysis mode, with the metal oxide particles 14 being reduced to the corresponding metal by means of the reducing agent formed. In discharging operation, the metal particles 14 are oxidized to the corresponding oxide again by means of oxygen ions, with the liberated energy being able to be taken off as electricity.

To ensure a high storage capacity and good charging and discharging kinetics, the particles 14 of the metal or metal oxide have to have a large active surface area. However, during the oxidation process, the metal atoms of the particles 14 tend to diffuse in the direction of the increasing oxygen ion gradient. This leads to demixing of the microstructure of the storage element 10, as a result of which the active surface area of the particles 14 is reduced and the storage capacity and charging and discharging kinetics are thus correspondingly impaired.

Figure 1:
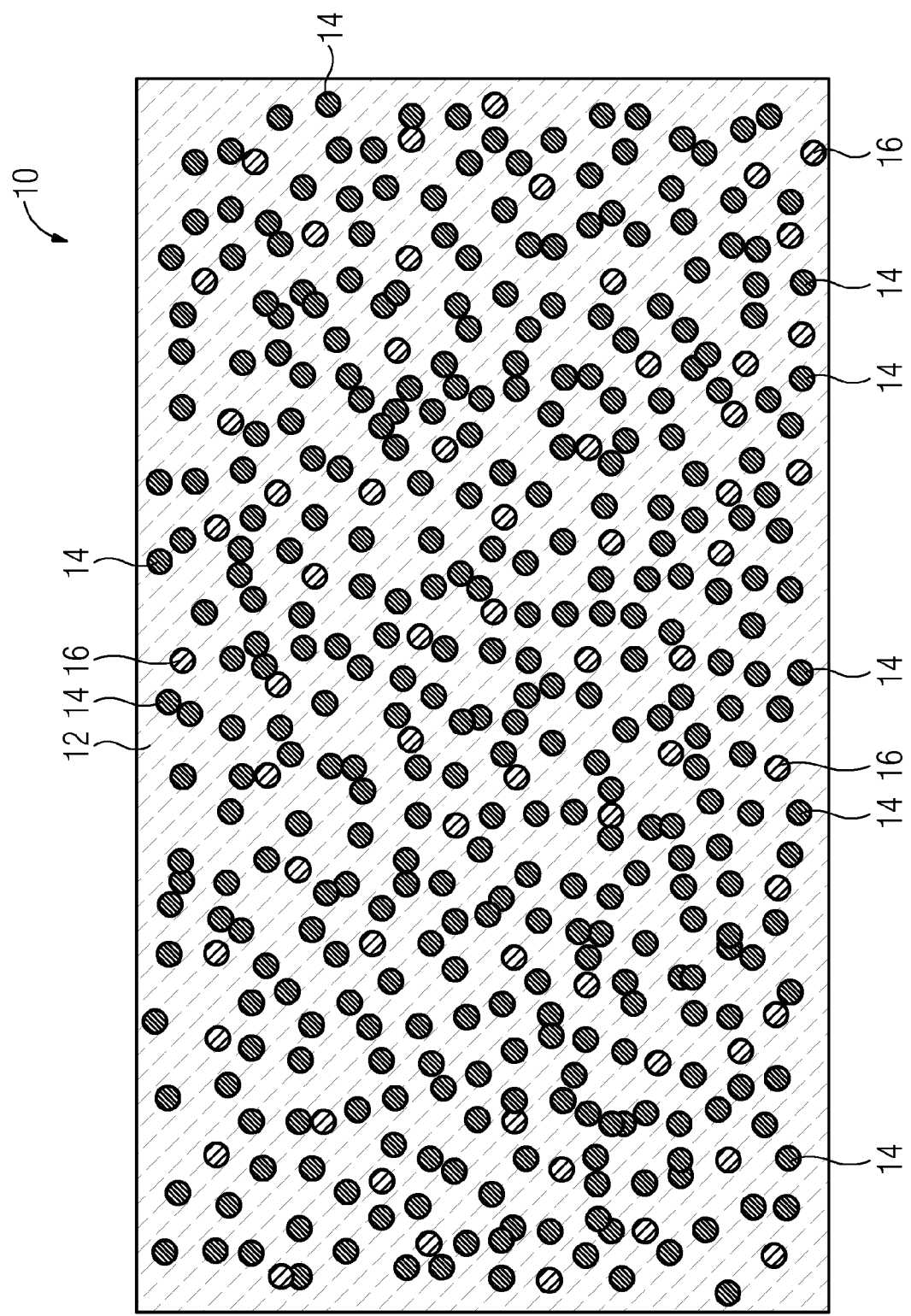
FIG. 1 shows a schematic section through an example of a storage element according to an embodiment of the invention with homogeneous and isotropic particle distribution.

To avoid this, particles 16 of another metal and/or an associated metal oxide are additionally embedded in the ceramic matrix 12. This can, as shown in FIG. 1, occur in the form of a homogeneous and isotropic distribution. When the metal oxides of the particles 14 are reduced to the corresponding metal, these metal atoms can alloy with the metal of the particles 16. It is important here that the atoms of the metal particle 16 have a lower diffusion velocity than the atoms of the metal particles 14 in the alloy formed. Furthermore, it has to be ensured that the metal of the particles 16 has to be chemically more noble than the metal of the particles 14, so that the particles 16 do not undergo any reaction during the oxidation-reduction cycle.

In practice, it is therefore advisable to use iron and iron oxides for the particles 14 and nickel for the particles 16. The ceramic matrix 12 can be any oxidic ceramic of main group or transition group elements, as long as the ceramic is redox-inert and thermally stable enough under the electrochemical operating conditions to survive operating temperatures of about 900° C. In the simplest case, it is possible to use aluminum oxide, magnesium oxide, zirconium oxide or the like, but the use of more complex mixed oxides, for example yttrium, scandium, zirconium mixed oxides, gadolinium, cerium mixed oxides, complex mixed oxides having a first metallic component from the group consisting of lanthanum, strontium, calcium, barium, cerium and a second metallic component from the group consisting of iron, titanium, chromium, gadolinium, cobalt, manganese, is also possible.

Figure 2:
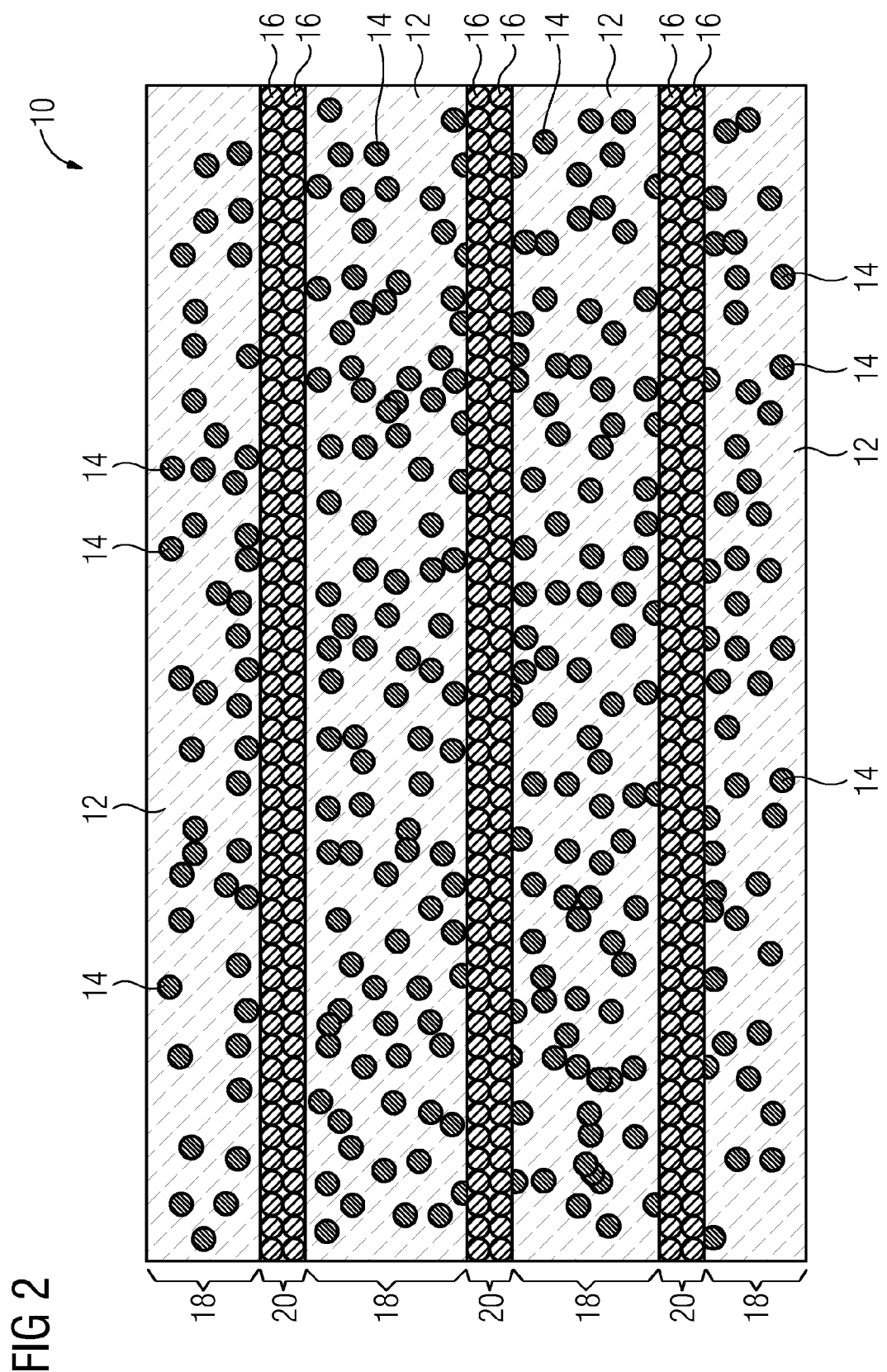
FIG. 2 shows a schematic section through a further example of a storage element according to an embodiment of the invention having a layer structure.

As an alternative to the homogeneous and isotropic distribution of the particles 14, 16 in the matrix 12, more complex structures are also possible. FIG. 2 shows an alternative embodiment of the storage element 10, in which the storage element 10 is made up of alternating layers 18, 20. The layers 18 are formed by a ceramic matrix 12 in which only particles 14 of the metal or metal oxide which participates in the redox process are embedded. In contrast, the layers 20 consist exclusively of particles 16 of the alloy former. The layers 20 here form a diffusion barrier for the atoms of the particles 14, so that, here too, diffusion is countered, or rehomogenization during charging operation is made possible. Rehomogenization can in all cases be controlled in a targeted manner by means of the charging conditions selected, in particular by the choice of temperature, time and current.

Figure 3:
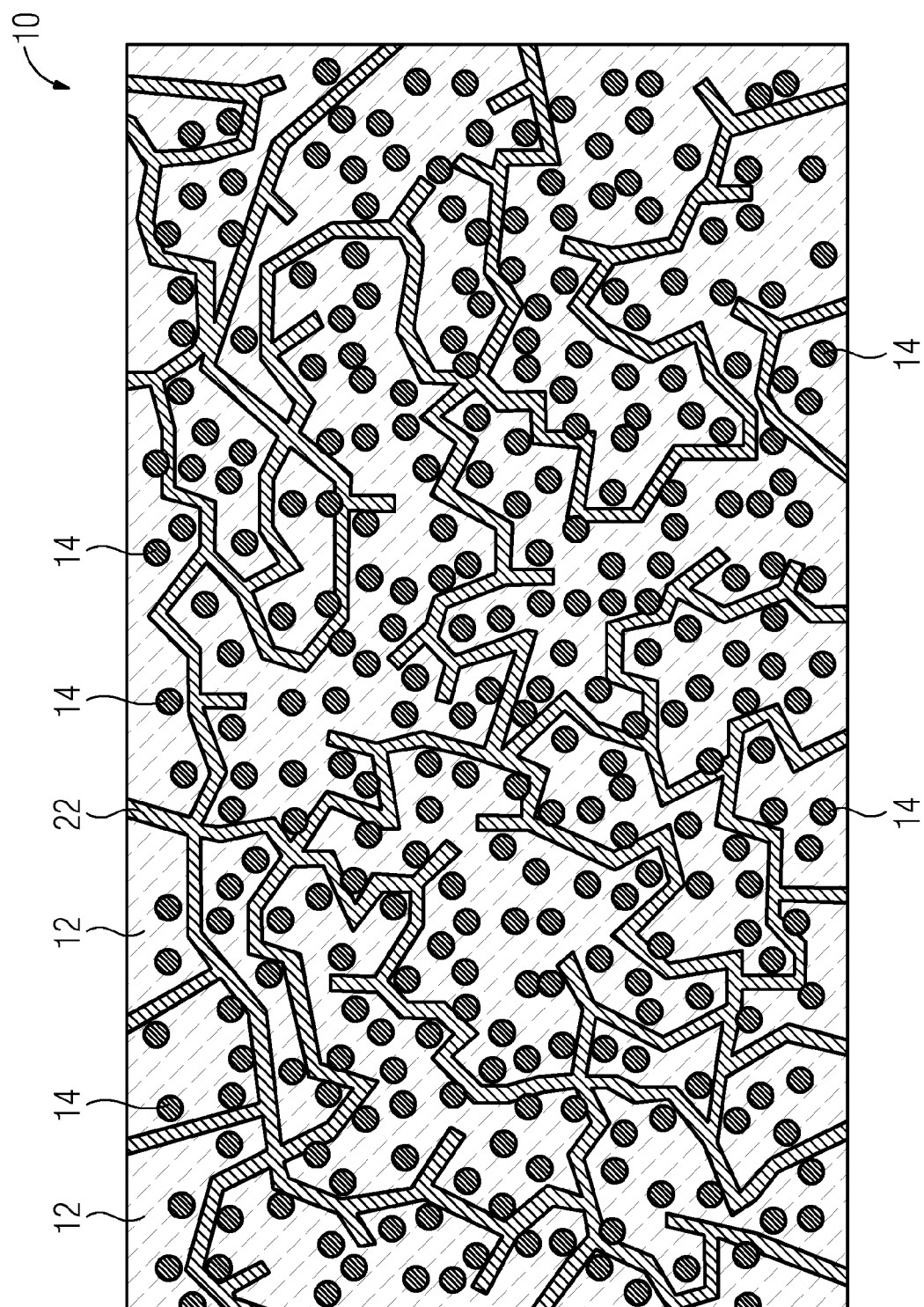
FIG. 3 shows a schematic section through a further example of a storage element according to an embodiment of the invention having a skeleton-like microstructure.

Finally, FIG. 3 shows a further embodiment of a storage element 10 according to an embodiment of the invention, in which the particles 14 of the metal-metal oxide system which participates in the redox process are homogeneously distributed in the ceramic matrix 12. Within the matrix 12, a skeleton structure 22 of particles 16 of the alloy former is also provided. Here too, an efficient diffusion barrier or an assisting structure for rehomogenization is formed, but, in contrast to a layer structure as per FIG. 2, this has no preferential direction.

The production of such structures can be carried out, depending on the microstructure of the storage element 10, using a number of ceramic production methods, for example pressing, extrusion, tape casting and subsequent stacking of the sheets and the like, so that reliable mass production is ensured.

The invention claimed is:

1. A storage element for a solid electrolyte battery, comprising:
   a main element composed of a porous ceramic matrix comprising first particles embedded therein, the first particles comprising at least one of particles of a first metal and particles of a first metal oxide of a redox pair,
   wherein the storage element comprises further particles comprising at least one of particles of a further metal and particles of an associated metal oxide, wherein the further metal is more chemically noble than the first metal,
   wherein the proportion by volume of the first particles is more than 50% by volume of the solids volume of the storage element, and
   wherein the storage element comprises alternating layers of ceramic matrix with embedded first particles and layers of the further particles.

2. The storage element as claimed in claim 1,
   wherein the further metal has a different diffusion velocity than the first metal in an alloy of the first metal and the further metal.

3. The storage element as claimed in claim 1,
   wherein the storage element has a pore volume of less than 50% by volume of its total volume.

4. The storage element as claimed claim 1,
   wherein the first metal is Fe.

5. The storage element as claimed claim 1,
   wherein the further metal is Ni.

6. The storage element as claimed claim 1,
   wherein the ceramic matrix is an oxidic ceramic.

7. The storage element as claimed in claim 1,
   wherein the ceramic matrix is selected from the group consisting of $(Y,Sc,Zr)O_2$, $(Gd,Ce)O_2$, $Al_sO_3$, MgO, $TiO_2$, and $(La,Sr,Ca,Ba,Ce)(Fe,Ti,Cr,Ga,Co,Mn)O_3$.

8. The storage element as claimed in claim 1, wherein the first metal is selected from the group consisting of nickel, copper, silver, gold, platinum, and palladium.

9. A storage element for a solid electrolyte battery, comprising:
   a main element comprising a porous ceramic matrix comprising first particles embedded therein, the first particles comprising at least one of particles of a first metal and particles of a first metal oxide of a redox pair; and
   further particles comprising particles of a further metal, wherein the further metal is more chemically noble than the first metal;
   wherein the storage element comprises alternating layers of the porous ceramic matrix with the first particles and layers of the further particles.

10. A storage element for a solid electrolyte battery, comprising:
    a main element comprising a porous ceramic matrix comprising discrete spherical first particles embedded therein, the discrete spherical first particles comprising at least one of discrete spherical particles of a first metal and discrete spherical particles of a first metal oxide of a redox pair; and
    further discrete spherical particles comprising particles of a further metal, wherein the further metal is more chemically noble than the first metal,
    wherein the storage element comprises alternating layers of the porous ceramic matrix with the discrete spherical first particles and layers of the further discrete spherical particles.

* * * * *